(12) United States Patent
Malovany et al.

(10) Patent No.: US 10,051,450 B1
(45) Date of Patent: Aug. 14, 2018

(54) BLUETOOTH DATA FORWARDING

(71) Applicant: Texas Instruments Incorporated, Dallas, TX (US)

(72) Inventors: Ram Malovany, Nes Ziona (IL); Chen Loewy, Herzelia (IL); Dotan Ziv, Tel Aviv (IL); Lior Gersi, Tel Aviv (IL); Liran Cohen, Yavne (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/696,902

(22) Filed: Sep. 6, 2017

(51) Int. Cl.
| | |
|---|---|
| *H04B 7/00* | (2006.01) |
| *H04W 4/80* | (2018.01) |
| *H04W 4/00* | (2018.01) |
| *H04W 80/06* | (2009.01) |
| *H04W 52/02* | (2009.01) |
| *H04W 40/00* | (2009.01) |
| *H04R 3/12* | (2006.01) |
| *H04W 84/18* | (2009.01) |

(52) U.S. Cl.
CPC ............ *H04W 4/80* (2018.02); *H04W 4/008* (2013.01); *H04R 3/12* (2013.01); *H04R 2420/07* (2013.01); *H04W 40/005* (2013.01); *H04W 52/0235* (2013.01); *H04W 80/06* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,082,461 | B2 * | 7/2006 | Sharma ................. | H04W 28/18 709/220 |
| 7,529,237 | B2 * | 5/2009 | Ami ................... | H04L 29/12009 370/389 |
| 7,546,099 | B2 | 6/2009 | Trost et al. | |
| 8,126,982 | B2 * | 2/2012 | Nidd ....................... | H04L 67/16 709/217 |
| 8,190,716 | B2 * | 5/2012 | Zhodzishsky ........... | G06F 21/85 709/220 |
| 8,275,316 | B2 * | 9/2012 | Ding ................... | H04W 52/362 455/13.4 |
| 8,583,169 | B2 * | 11/2013 | Walley ................. | G01S 5/0045 455/41.2 |

(Continued)

*Primary Examiner* — Tuan A Tran
(74) *Attorney, Agent, or Firm* — Gregory J. Albin; Charles A. Brill; Frank D. Cimino

(57) ABSTRACT

A Bluetooth (BT) device includes a host processor and a BT controller coupled by a Host Controller Interface (HCI) including a Host Controller Transport Layer and a HCI Driver. The host processor implements an applications layer and includes HCI firmware for communicating via the Host Controller Transport Layer with the BT controller. The BT controller includes a processor coupled to a memory and to a transceiver, and a RF driver. The HCI firmware also includes HCI command code for a user to define a topology of the BT network including configuring the BT device in a current chain including a plurality of BT devices including configuring from which BT device it receives data from and which BT device it forwards data to. For communicating data across the BT network the BT device forwards the data without host processor involvement in at least resending the data back to its BT controller.

18 Claims, 5 Drawing Sheets

(56) References Cited

U.S. PATENT DOCUMENTS

| | | |
|---|---|---|
| 8,761,671 B2 | 6/2014 | Singer et al. |
| 9,258,671 B2 * | 2/2016 | Tsaur .................... H04W 4/008 |
| 9,306,872 B2 * | 4/2016 | Donaldson ............. H04L 49/20 |
| 9,426,835 B2 * | 8/2016 | Van De Laar ........ H04W 76/10 |
| 9,433,033 B2 * | 8/2016 | Luft ...................... H04W 84/18 |
| 2002/0120750 A1 * | 8/2002 | Nidd ....................... H04L 67/16 709/227 |
| 2003/0021262 A1 * | 1/2003 | Ma ........................... G06F 9/544 370/352 |
| 2003/0104826 A1 * | 6/2003 | Deng .................... H04W 76/10 455/462 |
| 2006/0146777 A1 * | 7/2006 | Ami ................. H04L 29/12009 370/338 |
| 2011/0161529 A1 * | 6/2011 | Chen .................... G06F 13/385 710/5 |
| 2013/0089080 A1 * | 4/2013 | Singer .................. G06F 13/385 370/338 |

\* cited by examiner

METHOD 200

201 — PROVIDING BLUETOOTH DEVICES AT RESPECTIVE NODES IN A BLUETOOTH NETWORK, WHERE THE BLUETOOTH DEVICES COMPRISE A HOST PROCESSOR AND A BLUETOOTH CONTROLLER COUPLED TO ONE ANOTHER BY A HOST CONTROLLER INTERFACE (HCI) INCLUDING A HOST CONTROLLER TRANSPORT LAYER AND A HOST CONTROLLER INTERFACE DRIVER. THE HOST PROCESSOR IMPLEMENTING AN APPLICATIONS LAYER AND INCLUDES HOST CONTROLLER INTERFACE FIRMWARE FOR COMMUNICATING VIA THE HOST CONTROLLER TRANSPORT LAYER WITH THE BLUETOOTH CONTROLLER. THE HOST CONTROLLER INTERFACE FIRMWARE INCLUDES HOST CONTROLLER INTERFACE COMMAND CODE WHICH ALLOWS A USER TO DEFINE A TOPOLOGY OF THE BLUETOOTH NETWORK, INCLUDING CONFIGURING EACH BLUETOOTH DEVICE IN A CURRENT CHAIN INCLUDING FROM WHICH ONE OF THE BLUETOOTH DEVICES IT RECEIVES DATA FROM TO WHICH ONE OF BLUETOOTH DEVICES IT SHOULD FORWARD DATA TO

202 — CONFIGURING THE BLUETOOTH NETWORK COMPRISING CONFIGURING EACH BLUETOOTH DEVICE IN A CURRENT CHAIN FROM WHICH BLUETOOTH DEVICE IT RECEIVES DATA INCLUDING AT LEAST ONE PACKET FROM, AND TO WHICH ONE OF THE BLUETOOTH DEVICES IT FORWARDS THE DATA TO

203 — COMMUNICATING THE DATA ACROSS THE BLUETOOTH NETWORK WITH THE BLUETOOTH DEVICES FORWARDING THE DATA BETWEEN THE BLUETOOTH DEVICES WITHOUT THE HOST PROCESSORS INVOLVEMENT IN AT LEAST RESENDING THE DATA BACK TO THEIR BLUETOOTH CONTROLLER

FIG. 2

BLUETOOTH DATA FORWARDING

FIELD

Disclosed embodiments relate generally to the field of Bluetooth devices in Bluetooth network communications, more specifically to data forwarding between such Bluetooth devices.

BACKGROUND

Bluetooth (BT) is an example ad-hoc networking technology. BT technology is a wireless communication standard generally used when transferring information between two or more wireless devices that are near to one another when speed is not a consideration, including telephones, printers, modems and headsets. BT is well suited for low-bandwidth applications including transferring sound data with telephones (e.g., with a BT headset) or byte data with hand-held computers (transferring files), or keyboards and mice. The BT Special Interest Group (SIG) specification may be used for these BT communications.

One use for BT is for scatternets which include a plurality of independent and unsynchronized piconets, where piconets are a basic unit of BT networking. In a piconet, there is a master device and one or more slave devices, where the devices each generally include a host processor (or 'application processor') and a controller (or 'firmware (FW) processor'). The master device determines the channel and phase for the slave device(s). A scatternet is a type of adhoc computer network comprising two or more piconets. In a scatternet, a slave device can communicate with more than one piconet. In connection with operation of a scatternet, the BT master devices may relay the identity of mobile slave devices that are within their individual piconets to its host processor for purposes of tracking the location of a mobile slave device, or the location of a person carrying a mobile slave device.

As shown in FIG. 1, in order to forward data using BT over a BT network such as a scatternet where the BT devices shown as BT devices 101, 102 and 103 are each not in the same piconet and hence each have a different master, each BT device in the communication chain needs to perform several steps. The BT devices are shown including a host processor 125a and a BT controller 125b that are coupled together by a Host Controller Interface (HCI). As known in the art HCI provides a uniform command method for accessing the BT hardware capabilities by providing a command interface to the baseband controller and link manager of the BT controller 125b, and access to hardware status and control registers.

Upon reception of the data, the BT devices other than the first BT device 101 shown as BT devices 102 and 103 in FIG. 1 each send this data to its host processor 125a. The host processor 125a parses the data, acts upon the received data (such as adds a timestamp, manipulates (changes the data), plays the data, or performs other data functionality), and then resends the data back to the BT controller 125b which only then transmits the data to the next BT device in the chain. In forwarding the data BT devices 102 and 103 thus each execute three (3) steps as shown in FIG. 1 including two (2) steps just looping through the host processor 125a, while the first BT device 101 in the chain executes 2 total steps.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for BT applications where each BT device includes a host processor and a BT controller coupled together by a HCI, conventional data forwarding for BT devices wakes up the host processor for looping with respect to its BT controller for every packet received including resending the data back to its BT controller, which wastes battery power, and also increases latency. For BT applications (e.g., scatternet applications) it is desirable to send data to the next BT device in the chain without involving the host processor, at least not looping through the host processor. This reduces the system power consumption dramatically in the Advanced Audio Distribution Profile (A2DP) use case.

All known BT-based communication systems involve the host processor of the BT devices participating in data forwarding by looping the data through the host processor before being forwarded to the next BT device in the chain including parsing, acting on, and resending the data to the BT controller. Advantages of disclosed data forwarding include enabling data such as A2DP data to be transferred from one BT device to several other BT devices without waking up the host, or at least not looping through its host processor.

A new mechanism generally in the FW layer of the BT device allows the user to forward Asynchronous Connection-Less (ACL) data without the host processor involvement in at least resending the data received back to its BT controller, which minimizes data latency and device power consumption. A disclosed set of new HCI commands between the host processor and BT controller enables a user to define the network topology to configure each BT device in the chain from which one of the BT devices the BT device receives data from, and to which one of the BT devices the BT device forwards the received data to. Disclosed HCI also optionally configures for each BT device whether to send the received data to its host processor or not, and if sent to its host processor, whether to add a time stamp to each packet or not (e.g., in order to time synchronize between the respective BT devices in the chain).

BRIEF DESCRIPTION OF THE DRAWINGS

Reference will now be made to the accompanying drawings, which are not necessarily drawn to scale, wherein:

FIG. 2 is a flowchart showing steps in an example method of BT ACL communications in a BT network, according to an example embodiment.

DETAILED DESCRIPTION

Figure 1:
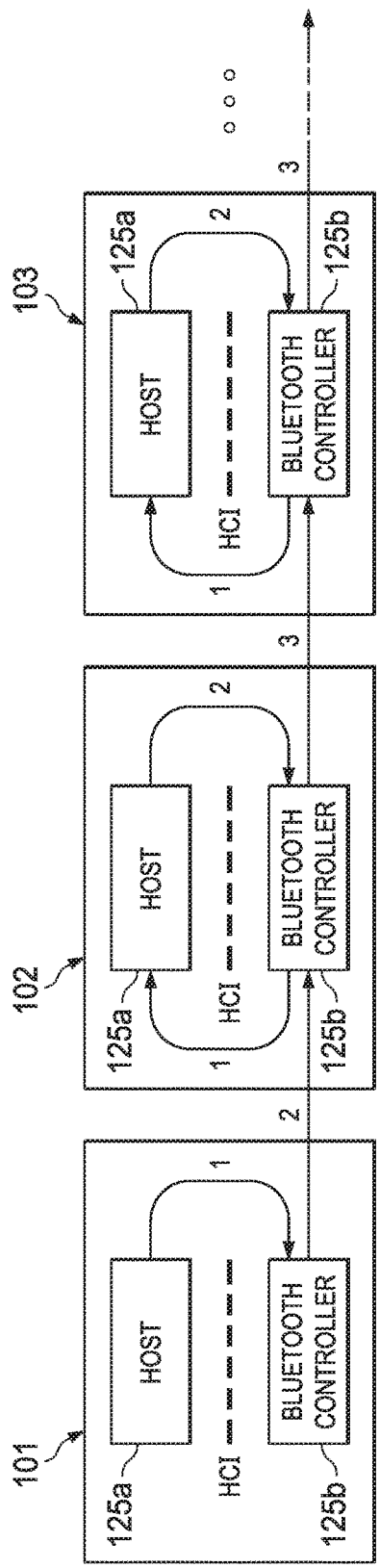
FIG. 1 depicts data forwarding over BT in a conventional BT network.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 2 is a flowchart showing steps for an example method 200 of BT ACL communications in a BT network, according to an example embodiment. The communications network can comprise a Bluetooth Special Interest Group (SIG) compliant network and the data can comprise audio data (e.g., A2DP data). However, disclosed BT data forwarding can also be applied to non-audio data, for example to a line of lights to decide which lights to turn on and which lights to keep off.

Step 201 comprises providing BT devices at respective nodes in a BT network, where the BT devices (see the BT device shown in FIGS. 4A and 4B described below) comprise a host processor and a BT controller coupled to one another by an HCI including a Host Controller Transport Layer and a HCI Driver. The host processor implements an applications layer and includes HCI Firmware for communicating via the Host Controller Transport Layer with its BT controller.

The BT controller includes a processor coupled to a memory and to a transceiver, and a RF driver for driving the transceiver that is adapted to be coupled to an antenna. The HCI firmware includes disclosed HCI command code which allows a user to define a topology of the BT network, including configuring each BT device in a current chain including from which one of the BT devices it receives data from to which one of BT devices it should forward data to. Step 202 comprises configuring the BT network comprising configuring each BT device in a current chain from which of the BT devices it receives data including at least one packet from, and to which one of the BT devices it forwards the data to. Step 203 comprises communicating the data across the BT network with the BT devices forwarding the data between the BT devices without the device's host processor's involvement in at least resending the data back to its BT controller.

Figure 3:
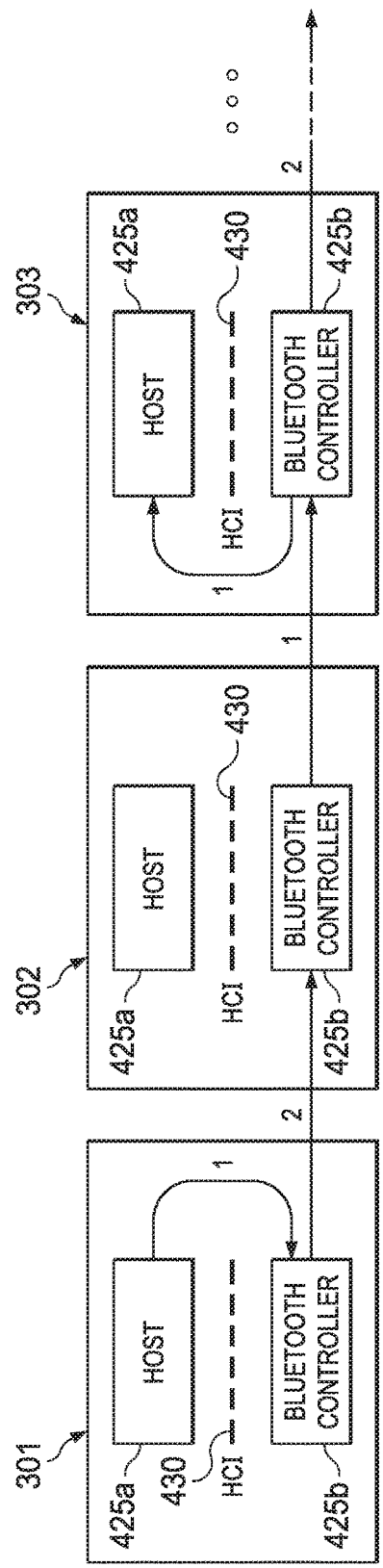
FIG. 3 depicts data forwarding over BT in a disclosed BT network arrangement that utilizes disclosed BT ACL data forwarding.

FIG. 3 depicts data forwarding over BT in a disclosed BT network arrangement that utilizes disclosed BT ACL data forwarding that can be compared to FIG. 1 described above. Each BT device 301, 302, and 303 in the chain includes a host processor 425a and a BT controller 425b coupled together by a HCI 430. As described above, this BT network arrangement can be a scatternet including a plurality of independent and unsynchronized piconets, with each BT device further comprising a sensor for implementing a BT-based wireless sensor network.

Upon reception of the data, the BT devices other than the first BT device 301 shown as BT devices 302 and 303 in FIG. 3 each send this data to the next BT device without their host processor's 425a involvement in at least resending the data back to their BT controller 425b. BT device 302 forwards the data without any involvement by its host processor 425a and is thus as shown only executing 1 step in forwarding the data. BT device 303 parses the data received, acts upon the received data (such as adds a timestamp), but without the host processor's 425a involvement resending the data back to its BT controller 425b thus shown executing 2 total steps in forwarding the data.

Figure 4A:
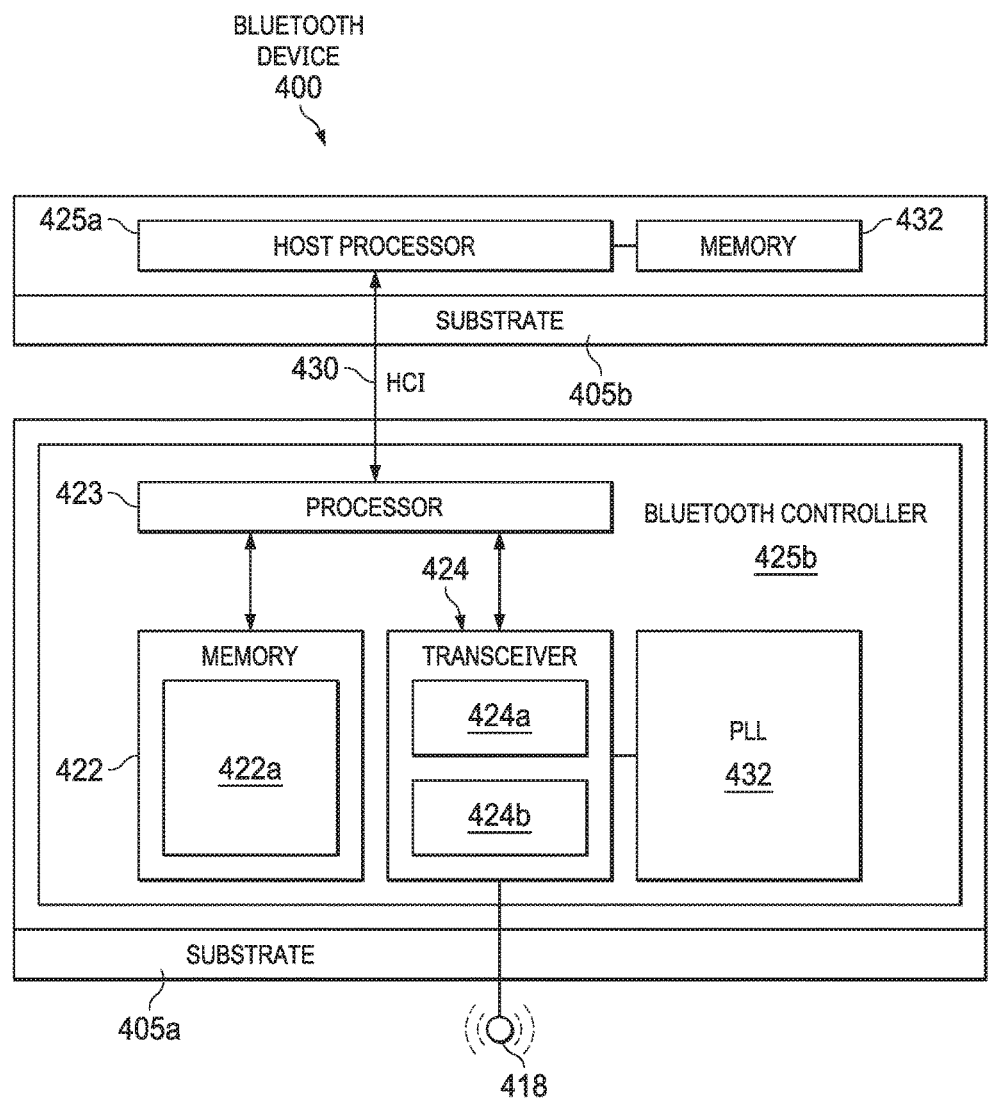
FIG. 4A is a block diagram schematic of an example BT device that utilizes disclosed BT ACL data forwarding.

FIG. 4A shows a system block diagram representation for an example BT device 400 that generally conforms to the BT communications standard. The BT device 400 generally comprises at least one integrated circuit (IC) shown formed on a substrate 405a having a semiconductor surface for the BT controller 425b, and on another substrate 405b having a semiconductor surface for the host processor 425a. The BT device 400 may be any device that can engage in BT communications. Such BT devices may be, may include, or may be a part of, mobile phones such as smartphone, tablets, computers, personal digital assistants, and household items with communication capabilities such as speakers, window blinds, and motion sensors. The BT device 400 in operation communicates in a BT network along with a plurality of other BT devices.

The BT device 400 comprises a host processor 425a and a BT controller 425b that communicate with one another over the HCI 430. The host processor 425a includes a memory 432 that stores disclosed HCI FW including disclosed HCI command code which allows a user to define a topology of the BT network, including configuring each BT device in a current chain including from which one of the BT devices it receives data including at least one packet from, and to which one of the BT devices it should forward the data to. The BT controller 425b includes a processor 423, a memory 422 including software source code 422a for parsing, understanding and acting on commands received from the host processor 425a for implementing disclosed ACL data forwarding for the BT device 400. BT device 400 also includes a transceiver 424 including a RF driver 424a that is adapted to be coupled to an antenna 418 which is generally off chip. The processors can comprise a digital signal processor (DSP) or microcontroller. The processors collectively implement a BT protocol stack for BT operations (see FIG. 4B described below).

The transceiver 424 is also shown including hardware comprising digital logic 424b that can be used as an alternative to software 422a for implementing disclosed ACL forwarding. As known in the art the transceiver 424 includes a transmitter and a receiver. The transmitter generally comprises a media access control (MAC) module, an encoder, a modulator, an Inverse Fast Fourier Transform (IFFT) unit, a digital to analog conversion (DAC)/filter module, and a RF/antenna module. The receiver generally comprises a RF/antenna unit, an analog to digital conversion (ADC)/filter unit, a FFT unit, a demodulator, a decoder, and a MAC module.

The memory 422 is more generally configured to store information including data, instructions, or both. The memory 422 may be any storage medium accessible by the processor 423, such as a read only memory (ROM), a random access memory (RAM), a register, cache memory, or magnetic media device such as internal hard disks and removable disks. A phase lock loop (PLL) 432 is also provided for purposes including mixing and frequency synthesis.

The processor 423 is coupled to the memory 422 and to the transceiver 424. In some implementations, the transceiver 424 comprises baseband units (not shown in FIG. 4A, but see FIG. 4B) and analog units (not shown) to transmit and receive RF signals. The baseband unit may comprise hardware to perform baseband signal processing including digital signal processing, coding and decoding, modulation, and demodulation. The analog unit may comprise hardware to perform analog-to-digital conversion (an ADC), digital to analog conversion (a DAC), filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at the radio frequencies of the BT network. The data rate utilized by the BT device 400 may be in the current BT frequency band of 2.472 GHz to 2.479 GHz, or any future BT frequency band utilized.

Figure 4B:
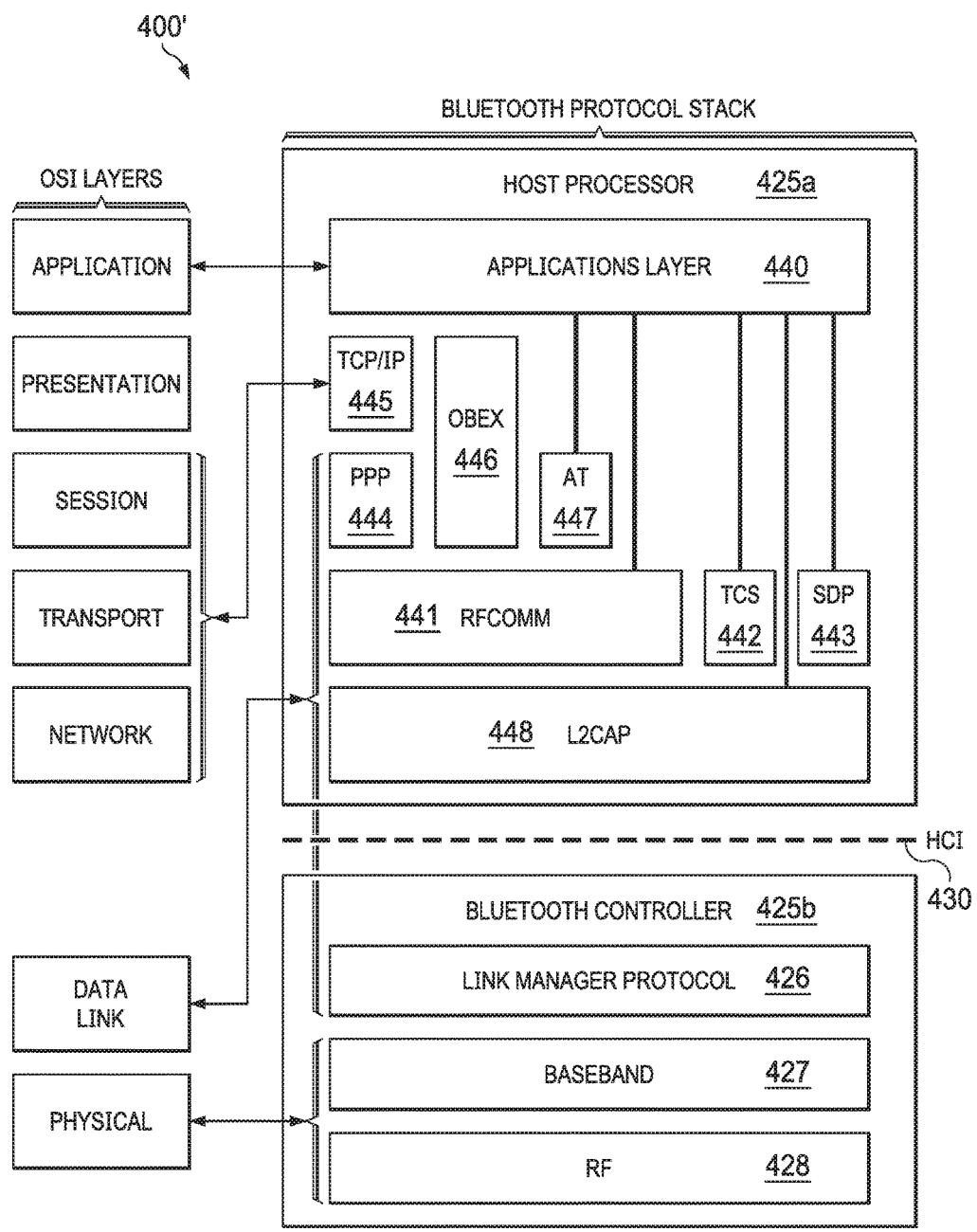
FIG. 4B is a block diagram schematic of a disclosed BT device including a separate host processor and BT controller coupled to one another by a HCI, where the HCI includes HCI firmware including stored HCI command code which allows a user to define a topology of the BT network including for configuring for each BT device in a current chain, according to an example embodiment.

FIG. 4B is a functional layer depiction of the BT device 400 shown in FIG. 4A now shown as 400' showing the host processor 425a including an application layer 440 including BT applications and a Logical Link Control and Adaptation Layer Protocol (L2CAP) layer 448. The BT protocol RFCOMM block 441 is a simple set of transport protocols, made on top of the L2CAP layer 448. The Telephony Control Protocol Specification (TCS) 442 defines ways to send audio calls between BT devices. The Service Discovery Protocol (SDP) 443 is a specification that defines a way to represent a range of UUIDs (which are nominally 128 bits) in a shorter form. The Point-to-Point Protocol (PPP 444) is a data link (layer 2) protocol used to establish a direct connection between two device nodes. The Transmission Control Protocol/Internet Protocol (TCP/IP) 445 enables the BT device to carry TCP/IP traffic, the OBEX 446 is a communications protocol that facilitates the exchange of binary objects between BT devices, and the AT 447 is a commands interface comprising a series of machine instructions used to activate features on the analog modem.

The BT controller 425b is shown including link manager protocol (LMP) 426, a baseband section and a RF section that are part of the transceiver 424 shown in FIG. 4A. The BT controller 425b is also shown including baseband circuitry 427 and RF circuitry 428. LMP 426 controls and negotiates all aspects of the operation of the BT connection between two adjacent BT devices.

EXAMPLES

Disclosed embodiments are further illustrated by the following specific Examples, which should not be construed as limiting the scope or content of this Disclosure in any way.

Figure 5A:
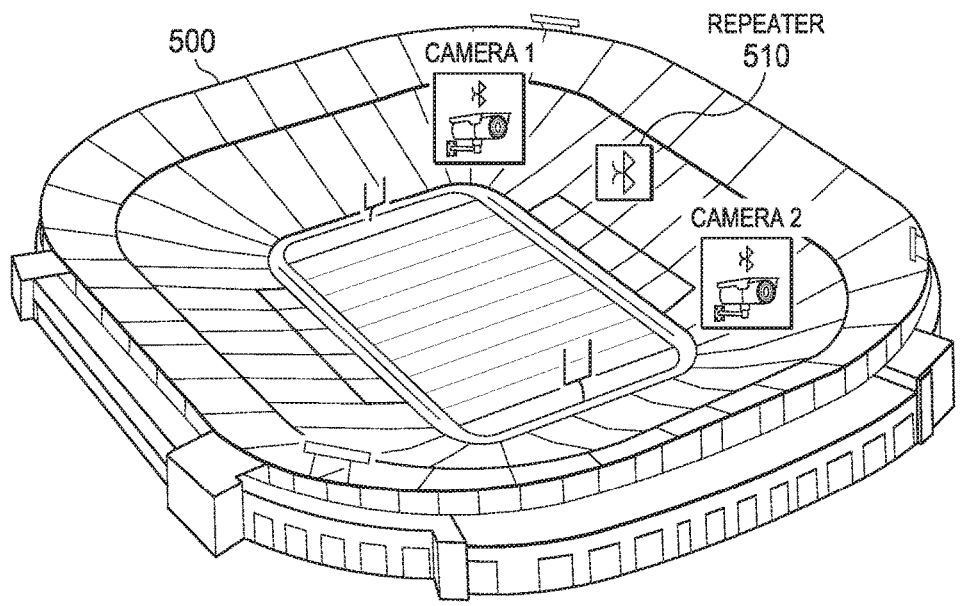
FIG. 5A shows video data forwarding in a stadium using disclosed BT ACL data forwarding and FIG. 5B shows audio data forwarding using disclosed BT ACL data forwarding which comprises A2DP data.

FIG. 5A shows video data forwarding in a stadium 500 using disclosed BT ACL data forwarding. Camera 1 and camera 2 each have disclosed BT devices such as BT device 400 shown in FIG. 4A which communicate with another using a repeater 510 in between due to their separation distance being beyond the BT communication range. The cameras 1 and 2 both implement disclosed data forwarding which enables the video data to be transferred from one camera to the other without waking up their host processor, or at least not looping through their host processor, which reduces latency and saves power compared to conventional data forwarding.

Figure 5B:
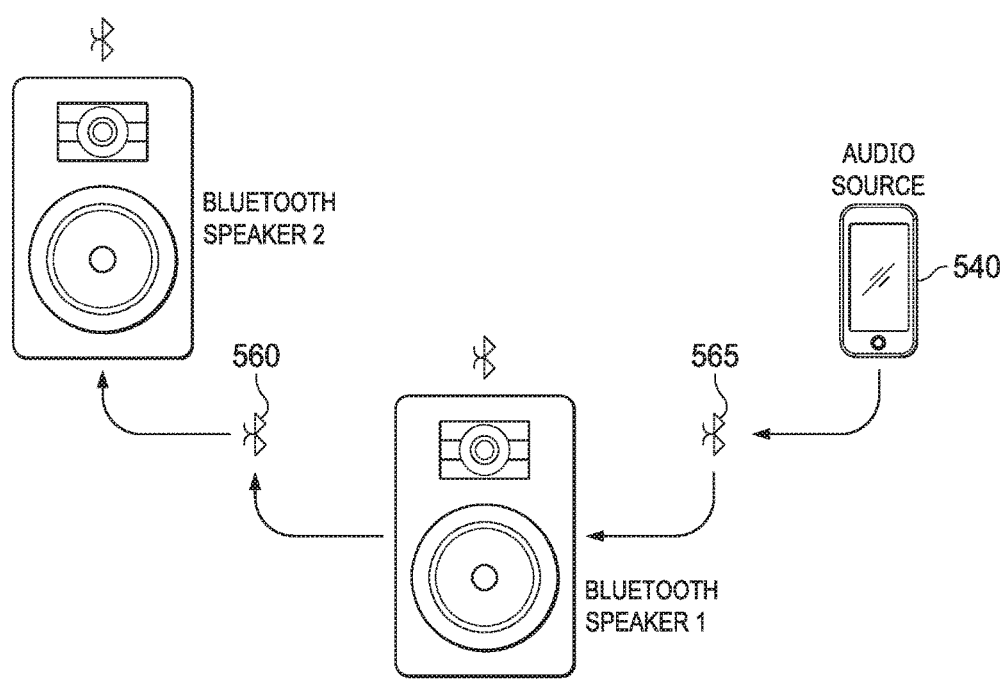

FIG. 5B shows audio data forwarding using disclosed BT ACL data forwarding which comprises A2DP data. BT speaker 1 and BT speaker 2 comprise disclosed BT devices such as shown in FIG. 4A which communicate with a repeater shown as repeater 560 in between due to their separation distance. An audio source 540 shown as a smart phone provides audio data to BT speaker 1, and another repeater shown as repeater 565 is between BT speaker 1 and the audio source 540 again due to their separation distance. As described above, the disclosed BT device in BT speaker 1 sends ACL data to BT speaker 2 without involving their host processor, at least not looping through its host processor which reduces the system power consumption, particularly in this A2DP use case.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, although BT communications are generally described herein using ACL, disclosed BT communications may also utilize other link types, such as a Synchronous Connection Oriented (SCO) link which comprises a set of reserved timeslots on an existing ACL transport.

The invention claimed is:

1. A method of Bluetooth (BT) asynchronous connectionless (ACL) communications, comprising:
providing BT devices at respective nodes in a BT network, said BT devices each comprising a host processor and a BT controller coupled to one another by a Host Controller Interface (HCI) including a Host Controller Transport Layer and a HCI Driver, said host processor implementing an applications layer and including HCI Firmware for communicating via said Host Controller Transport Layer with said BT controller, said BT controller including a processor coupled to a memory and to a transceiver, and a RF driver for driving said transceiver which is adapted to be coupled to an antenna;
said HCI firmware including HCI command code which allow a user to define a topology of said BT network, including configuring for each said BT device in a current chain including from which one of said BT devices it receives data including at least one packet, and to which one of said BT devices it should forward said data;
configuring said BT network including configuring each said BT device in said current chain except a first of said BT devices from which one of said BT devices it receives said data and to which one of said BT devices it should forward said data, and
communicating said data across said BT network, wherein said BT devices forward said data across said BT network without said host processor's involvement in at least resending said data back to said BT controllers of said BT devices.

2. The method of claim 1, wherein said HCI command code further comprises code which allows said user to define whether to send said data to said host processor or not.

3. The method of claim 2, wherein said HCI command code further allows said user to define whether to add a time stamp to each said packet or not.

4. The method of claim 1, wherein said data comprises audio data.

5. The method of claim 1, wherein for at least one of said BT devices, said host processor of said at least one of said BT devices sleeps during said communicating.

6. The method of claim 1, wherein said BT network comprises a scatternet including a plurality of independent and unsynchronized piconets.

7. The method of claim 1, wherein said BT controller is formed on an integrated circuit (IC) comprising a substrate having at least a semiconductor surface, and wherein said processor of said BT controller comprises a digital signal processor (DSP).

8. A Bluetooth (BT) controller, comprising:
a processor coupled to a memory and to a transceiver, a RF driver for driving said transceiver which is adapted to be coupled to an antenna, said memory including software for parsing, understanding and acting on commands received from a host processor coupled to a Host Controller Interface (HCI) including a Host Controller Transport Layer and a HCI Driver, and HCI command code firmware which defines a topology of a BT network of BT devices including said BT controller and said host processor, including receiving configuring information from said host processor regarding which one of said BT devices it receives data including at least one packet, and to which one of said BT devices it should forward said data;
said BT controller for communicating said data for said BT device across said BT network including for forwarding said data across said BT network without said host processor's involvement in at least resending said data back to said BT controller of said BT device.

9. The BT controller of claim 8, wherein said BT controller is formed on an integrated circuit (IC) comprising a substrate having at least a semiconductor surface, and wherein said processor of said BT controller comprises a digital signal processor (DSP).

10. The BT controller of claim 8, wherein said HCI command code further comprises code which allows a user to define whether to send said data to said host processor or not.

11. The BT controller of claim 10, wherein said HCI command code further allows said user to define whether to add a time stamp to each said packet or not.

12. The BT controller of claim 8, wherein said data comprises audio data.

13. A Bluetooth (BT) device, comprising:
a host processor and a BT controller coupled to one another by a Host Controller Interface (HCI) including a Host Controller Transport Layer and a HCI Driver, said host processor implementing an applications layer and including HCI Firmware for communicating via said Host Controller Transport Layer with said BT controller;
said BT controller including a processor coupled to a memory and to a transceiver, a RF driver for driving said transceiver which is adapted to be coupled to an antenna;
said HCI firmware also including HCI command code which allows a user to:
define a topology of a BT network, including configuring for each said BT device in a current chain including from which one of said BT device it receives data including at least one packet, and to which one of said BT devices it should forward said data, and
configure said BT device in said current chain within said BT network including a plurality of BT devices including configuring from which one of said BT devices it receives said data and to which one of said BT devices it should forward said data,
wherein for communicating said data across said BT network said BT device forwards said data without said host processor's involvement in at least resending said data back to said BT controller of said BT device.

14. The BT device of claim 13, wherein said HCI command code further comprises code which allows said user to define whether to send said data to said host processor or not.

15. The BT device of claim 13, wherein said HCI command code further allows said user to define whether to add a time stamp to each said packet or not.

16. The BT device of claim 13, wherein said data comprises audio data.

17. The BT device of claim 13, wherein said host processor is configured to sleep during said communicating.

18. The BT device of claim 13, wherein said BT controller is formed on an integrated circuit (IC) comprising a substrate having at least a semiconductor surface, and wherein said processor of said BT controller comprises a digital signal processor (DSP).

* * * * *